United States Patent
Deacon et al.

(10) Patent No.: US 11,842,195 B2
(45) Date of Patent: Dec. 12, 2023

(54) CONDITIONAL YIELD TO HYPERVISOR INSTRUCTION

(71) Applicant: Arm Limited, Cambridge (GB)

(72) Inventors: William James Deacon, Cambridge (GB); Marc Zyngier, Cambridge (GB)

(73) Assignee: Arm Limited, Cambridge (GB)

( * ) Notice: Subject to any disclaimer, the term of this patent is extended or adjusted under 35 U.S.C. 154(b) by 165 days.

(21) Appl. No.: 17/310,784

(22) PCT Filed: Jan. 7, 2020

(86) PCT No.: PCT/GB2020/050025
§ 371 (c)(1),
(2) Date: Aug. 24, 2021

(87) PCT Pub. No.: WO2020/174209
PCT Pub. Date: Sep. 3, 2020

(65) Prior Publication Data
US 2022/0121445 A1    Apr. 21, 2022

(30) Foreign Application Priority Data
Feb. 28, 2019 (GB) .................................. 1902709

(51) Int. Cl.
*G06F 9/30* (2018.01)
*G06F 9/38* (2018.01)
(Continued)

(52) U.S. Cl.
CPC ...... *G06F 9/30145* (2013.01); *G06F 9/30072* (2013.01); *G06F 9/30189* (2013.01);
(Continued)

(58) Field of Classification Search
CPC ............. G06F 9/30145; G06F 9/30072; G06F 9/30189; G06F 9/3836; G06F 9/45558;
(Continued)

(56) References Cited

U.S. PATENT DOCUMENTS 5,463,778 A * 10/1995 Johnson ................ G06F 9/3861
712/229
10,019,282 B1 * 7/2018 Naenko ............... G06F 9/45558
(Continued)

FOREIGN PATENT DOCUMENTS

GB         2487575 A  *  8/2012  .............. G06F 11/36
WO      2014/081608         5/2014

OTHER PUBLICATIONS

Bedichek, Robert, "Some Efficient Architecture Simulation Techniques", Department of Computer Science, FR-35, University of Washington, 1990.

*Primary Examiner* — Farley Abad
(74) *Attorney, Agent, or Firm* — NIXON & VANDERHYE P.C.

(57) ABSTRACT

An apparatus comprises processing circuitry which has a hypervisor execution mode for execution of a hypervisor for managing one or more virtual processors executing on the processing circuitry, and at least one less privileged execution mode than the hypervisor execution mode. In response to a conditional yield to hypervisor instruction executed in the at least one less privileged execution mode, an instruction decoder controls the processing circuitry to determine whether at least one trap condition is satisfied, and when the at least one trap condition is determined to be satisfied, to switch the processing circuitry to the hypervisor execution mode; and store, in at least one storage element accessible to instructions executed in the hypervisor execution mode, at least one item of scheduling hint information for estimating whether the at least one trap condition is still satisfied.

16 Claims, 6 Drawing Sheets

(51) Int. Cl.
*G06F 9/455* (2018.01)
*G06F 12/1009* (2016.01)

(52) U.S. Cl.
CPC ........ *G06F 9/3836* (2013.01); *G06F 9/45558* (2013.01); *G06F 12/1009* (2013.01); *G06F 2009/45583* (2013.01)

(58) Field of Classification Search
CPC ....... G06F 12/1009; G06F 2009/45583; G06F 2212/151; G06F 2212/651; G06F 9/3009; G06F 9/45533; G06F 12/1036; G06F 9/4843
See application file for complete search history.

(56) References Cited

U.S. PATENT DOCUMENTS

| | | | |
|---|---|---|---|
| 10,592,281 B1* | 3/2020 | Saidi | G06F 9/4881 |
| 2005/0102671 A1* | 5/2005 | Baumberger | G06F 9/546 718/1 |
| 2007/0260863 A1 | 11/2007 | Moyer et al. | |
| 2008/0140998 A1 | 6/2008 | Kissell | |
| 2015/0121377 A1* | 4/2015 | Zang | G06F 9/45558 718/1 |
| 2015/0339142 A1* | 11/2015 | Tsirkin | G06F 13/24 710/267 |
| 2016/0019066 A1 | 1/2016 | Diamos et al. | |
| 2016/0170912 A1* | 6/2016 | Warkentin | G06F 13/24 726/17 |
| 2017/0109197 A1* | 4/2017 | Coleman | G06F 9/45558 |
| 2017/0220369 A1* | 8/2017 | Kaplan | G06F 12/1045 |
| 2018/0248700 A1* | 8/2018 | Tsirkin | G06F 21/602 |

\* cited by examiner

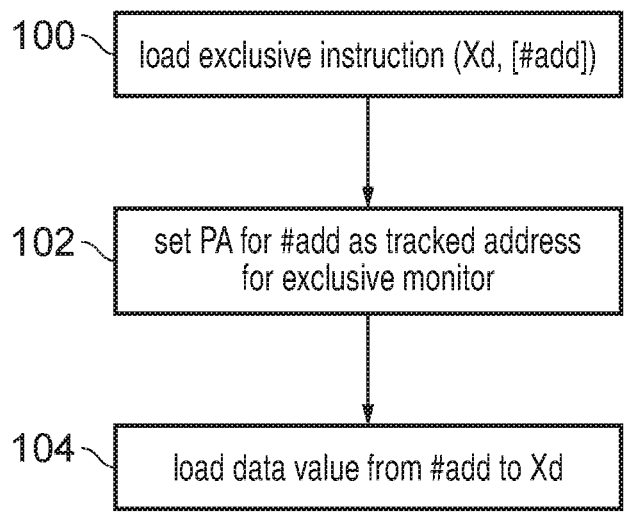
FIG. 5
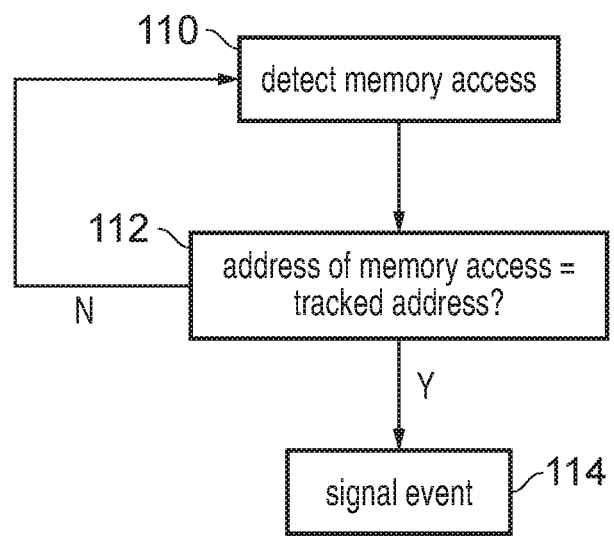
FIG. 6
WFE Xa, Xb
FIG. 7

CONDITIONAL YIELD TO HYPERVISOR INSTRUCTION

The present technique relates to the field of data processing.

In a virtualised data processing system, a hypervisor may manage one or more virtual processors executing on physical processing circuitry. The virtual processors may be mapped by the hypervisor onto resources of a physical processing platform which may include one or more physical processor cores. The hypervisor may support execution of a number of virtual machines, with each virtual machine able to request that the hypervisor creates a given number of virtual processors for that virtual machine, each virtual processor emulating the behaviour of a physical processor core. The hypervisor may manage the mapping between virtual resources required by a given virtual processor and the physical resources actually provided in hardware, as well as controlling scheduling of the respective virtual processors, to control when each virtual processor is allocated processing resource.

At least some examples provide an apparatus comprising: processing circuitry to perform data processing; and an instruction decoder to decode instructions to control the processing circuitry to perform the data processing; in which: the processing circuitry has a hypervisor execution mode for execution of a hypervisor for managing one or more virtual processors executing on the processing circuitry, and at least one less privileged execution mode than the hypervisor execution mode; in response to a conditional yield to hypervisor instruction executed in said at least one less privileged execution mode, the instruction decoder is configured to control the processing circuitry to: determine whether at least one trap condition is satisfied, and when the at least one trap condition is determined to be satisfied: switch the processing circuitry to the hypervisor execution mode; and store, in at least one storage element accessible to instructions executed in the hypervisor execution mode, at least one item of scheduling hint information for estimating whether the at least one trap condition is still satisfied.

At least some examples provide a data processing method for an apparatus comprising processing circuitry having a hypervisor execution mode for execution of a hypervisor for managing one or more virtual processors executing on the processing circuitry, and at least one less privileged execution mode than the hypervisor execution mode; the method comprising: decoding a conditional yield to hypervisor instruction executed in said at least one less privileged execution mode; and in response to decoding the conditional yield to hypervisor instruction: determining whether at least one trap condition is satisfied, and when the at least one trap condition is determined to be satisfied: switching the processing circuitry to the hypervisor execution mode; and storing, in at least one storage element accessible to instructions executed in the hypervisor execution mode, at least one item of scheduling hint information for estimating whether the at least one trap condition is still satisfied.

At least some examples provide a computer program for controlling a host data processing apparatus to provide an instruction execution environment for execution of instructions; the computer program comprising: instruction decoding program logic to decode instructions of target code executed in the instruction execution environment, to control the host data processing apparatus to perform data processing corresponding to the instructions of the target code, the instruction execution environment having a hypervisor execution mode for execution of a hypervisor for managing one or more virtual processors executed in the instruction execution environment, and at least one less privileged execution mode than the hypervisor execution mode; in which: in response to a conditional yield to hypervisor instruction of the target code executed in said at least one less privileged execution mode, the instruction decoding program logic is configured to control the host data processing apparatus to: determine whether at least one trap condition is satisfied, and when the at least one trap condition is determined to be satisfied: switch the instruction execution environment to the hypervisor execution mode; and store, in at least one data structure accessible to instructions of the target code executed in the hypervisor execution mode, at least one item of scheduling hint information for estimating whether the at least one trap condition is still satisfied.

A storage medium may be provided storing the computer program described above. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing system;

FIG. 5 is a flow diagram showing a method of processing a load exclusive instruction;

FIG. 6 is a flow diagram showing tracking of accesses to a tracked address by an exclusive monitor;

FIG. 7 shows an example of a conditional yield to hypervisor instruction;

Figure 1:
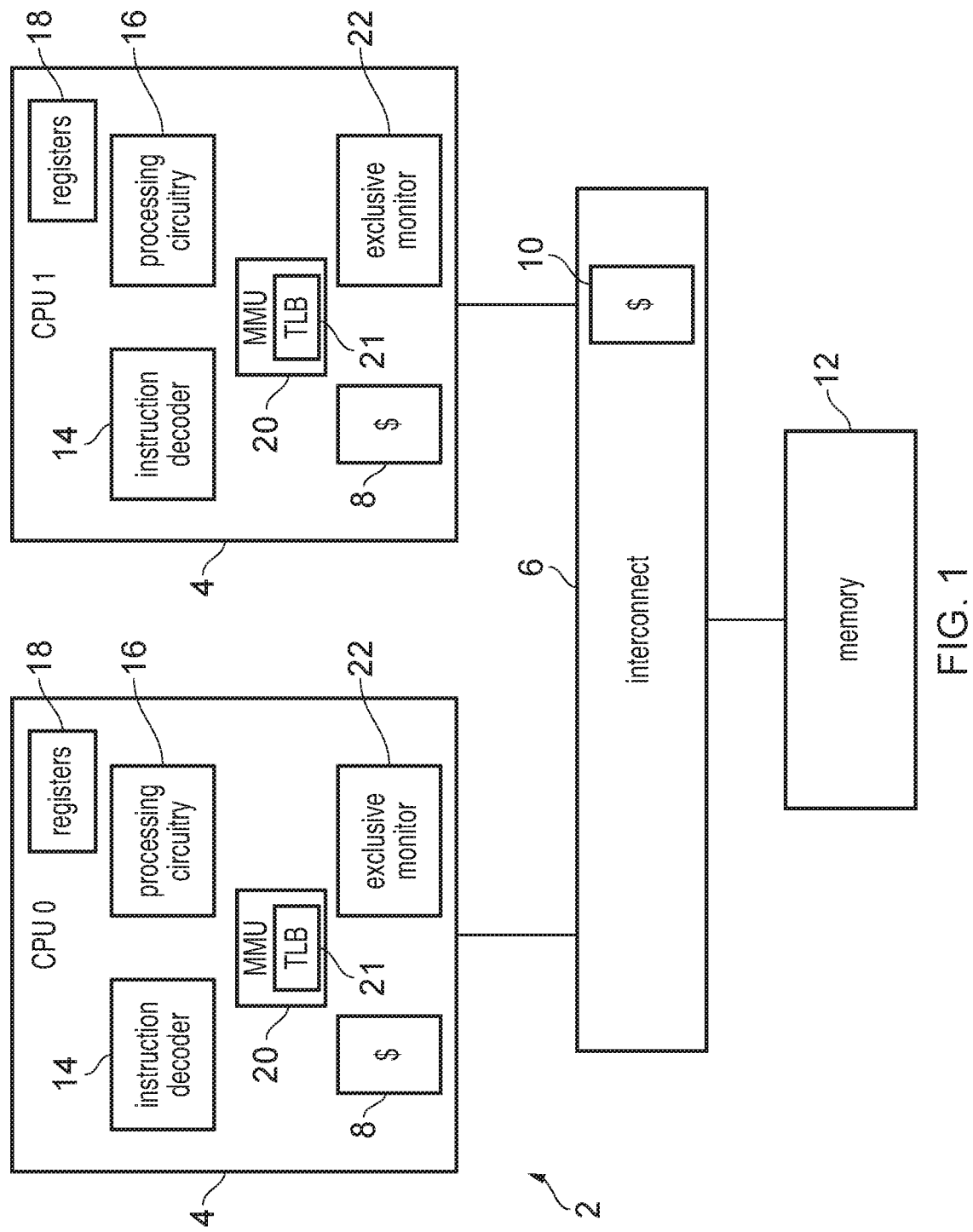

In some processing workloads, the currently executing process may not be able to make forward progress until some event occurs or a condition is satisfied, such as a data value at a given address in memory being set to a particular value. For example, this may be the case if a lock variable is being used to control access to a data structure in memory, where one process may have to wait to use that data structure until the lock variable has been cleared by another process to indicate that the other process is no longer using the same data structure. This can be useful for enforcing exclusive access to ensure that updates to the data structure are made atomically.

In a virtualised system, a process which is still waiting for some condition to be satisfied may voluntarily yield control of the processing circuitry to the hypervisor to allow the hypervisor to reschedule a different virtual processor if possible, so that the physical processing resources can be used for useful work in the time when the yielding virtual processor is waiting. However, it can be relatively difficult for the hypervisor to know which virtual processor to schedule next since the exact workload of each virtual processor is not generally known by the hypervisor. There may be little benefit in the hypervisor selecting for execution a virtual processor which is not currently able to make full progress.

Some processing workloads may use queued locking mechanisms, in which processors may use a queue structure to manage the order in which they are able to access the shared resource. If a hypervisor is scheduling virtual processors which use queued locking it can be important to schedule the virtual processors in the order in which they arrived in the queue so that physical processing resource is not wasted running a virtual processor that will not be able to make forward progress. Similarly, there is little point in scheduling a virtual processor which is waiting to read a variable controlled by a lock where the lock is already held by a writer.

One approach for addressing this issue may be to use para-virtualisation, in which the hypervisor offers services to implement concurrent data structures such as locks or queues, or even may offer a service for directed yield to a particular virtual processor. In these approaches the virtual machine and the hypervisor may communicate with each other via a shared data structure (e.g. queue) in memory which can be used to track the locking so that the hypervisor is able to determine whether a given virtual processor is likely to make forward progress. However, this approach has a number of disadvantages. Firstly, this approach is inherently non-portable between different hypervisor implementations, as a given piece of virtual machine code will need to include instructions for interacting with a specific form of control data structure offered by the particular hypervisor under which it is to execute. Hence, each time a new concurrent algorithm is implemented this would require extension of the code of a given virtual machine. Also, this approach would require cooperation between the developers of the hypervisor code and the virtual machine code, which may increase complexity and development costs. Also, this para-virtualisation may be disadvantageous from a performance point of view, as it may rely on an unconditional trap to the hypervisor which can add significant overhead in an under-subscribed system where there are relatively few other virtual processors competing for use of the processing resource provided by the hardware. Also, in some architectures explicit calls to the hypervisor may not be permitted for user-mode code so often application-level software may not be able to use these para-virtualised interfaces anyway. Also, access to such concurrent data structures may require additional address translation overhead both from the hypervisor and the virtual machine.

In the technique discussed below, architectural support is provided for a conditional yield to hypervisor instruction which enables a given virtual processor to yield control of a processing circuitry to the hypervisor conditionally, and also pass to the hypervisor scheduling hint information which can enable the hypervisor to determine whether it is efficient to attempt to reschedule the same virtual processor yet. This avoids the need for the hypervisor and the virtual processor to interact via a memory structure as discussed above and hence helps to improve portability of code and reduces the performance costs discussed above.

Hence, an apparatus may have processing circuitry which has a hypervisor execution mode for execution of a hypervisor for managing one or more virtual processors executed by the processing circuitry and at least one execution mode which is less privileged than the hypervisor execution mode. An instruction decoder may support decoding of a conditional yield to hypervisor instruction which, when executed in the at least one less privileged execution mode, controls the processing circuitry to determine whether at least one trap condition is satisfied. When the at least one trap condition is determined to be satisfied, the processing circuitry is controlled to switch to the hypervisor mode and to store, in at least one storage element accessible to instructions executed in the hypervisor mode, at least one item of scheduling hint information for estimating whether the at least one trap condition is still satisfied. Hence, by supporting passing of scheduling hint information to the hypervisor at an architectural level there is no need for a virtual machine and hypervisor to interact via memory for providing scheduling hints and this eliminates the issues discussed above with para-virtualisation.

The scheduling hint information returned by the processing circuitry in response to the conditional yield to hypervisor instruction could comprise any information which could enable the hypervisor to make an estimate of whether the trap condition would still be satisfied. For example, the scheduling hint information could comprise the values which the virtual processor was using to evaluate whether the trap condition is satisfied. For example, if the at least one trap condition was to be evaluated based on values in at least one register, then the values in the at least one register could be copied to a location accessible to the hypervisor's instructions to enable the hypervisor to test those data values and evaluate the condition.

However, in practice the registers accessible to less privileged execution modes may also be accessible to the hypervisor execution mode, and so there may be no need to actually copy the values of those registers between registers. Instead in some examples the scheduling hint information may comprises an indication of at least one register specifier which is specified by the conditional yield to hypervisor instruction. The size of the register specifier may often be smaller than the number of bits in the register itself, so this approach can reduce the number of bits to be written which can save energy.

In some systems the architecture may support registers of different register widths, and so in this case the scheduling hint information could also comprise an indication of a register width of at least one register specified by the at least one register specifier, so that the hypervisor will be able to determine how many bits of a register to check.

For example these registers could be used by the virtual processor to track the last seen value of a given memory address within the memory system, which may be polled to determine whether it has changed to a certain value indicating that the virtual processor can then proceed with the next section of code. By returning an indication of which registers stores the last seen value of the polled variable, this can allow the hypervisor to check whether that polled variable has changed from that last seen value, at which point it may now be worthwhile attempting to reschedule the previously executed virtual processor once more. While the polled variable is still the same as the last seen value, this will indicate that it is likely the trap condition will still be satisfied and so there will be no point in rescheduling the virtual processor until the value of the polled variable changes. Hence, in some examples the conditional yield to hypervisor instruction could be included in a sequence of code in which it follows a certain instruction which loads the value of the polled variable into a given destination register and then the conditional yield to hypervisor instruction could specify the register specifier of the destination register used to store the polled variable. It will be appreciated that this is just one example use case for the conditional yield to hypervisor instruction, and the same instruction could also be used to pass other information back to the hypervisor, where a register which stores information which is useful for deciding whether the trap condition is satisfied has its register specifier passed to the hypervisor as scheduling hint information so that the hypervisor can itself read the value from that register.

In some examples, the scheduling hint information could comprise an indication of a plurality of register specifiers specified by the conditional yield hypervisor instruction. In some cases it could be useful for a number of different values to be made available to the hypervisor in order to evaluate whether it is likely that the trap condition would still be satisfied for the previously executed virtual processor. For example, in some cases polling of a variable in memory may be qualified by a mask value which specifies which portion of the variable is to be checked. For example a lock variable used to control access to a given resource in memory could include a number of fields including a field specifying the identity of the process holding the lock as well as a field indicating whether the lock is currently set or cleared. A mask could be used to ensure that the polling is only responsive to changes of the field that indicates whether the lock is set or cleared. Hence, it may be useful to make such a mask available to the hypervisor, and this can be done by passing the register specifier of the mask register in addition to the register specifier of the register holding the last seen value of the polled variable. Again, this is just one use case and in general the conditional yield to hypervisor instruction may have an encoding which allows any two or more register specifiers to be copied into a location accessible to the hypervisor execution mode (regardless of what contents of those registers have been provided by earlier instructions).

The at least one storage element accessible to instructions executed in the hypervisor execution mode may be at least one register. In some cases the register to which the scheduling hint information is written may be a register which is inaccessible to other instructions executed in a less privileged execution mode than the hypervisor execution mode. This can avoid other virtual machines or applications running on the processing system being able to gain insight into the functioning of the virtual machine which triggered the yield to the hypervisor. This can be important in some implementations for which security is of concern.

In one example, the conditional yield to hypervisor instruction may comprise a wait-for-event (WFE) instruction for instructing the processing circuitry to wait until one of a class of one or more events is indicated as having occurred. The processing circuitry may determine that the at least one trap condition is unsatisfied when one of the class of one or more events is indicated as having occurred. The class of events could include various actions, such as the occurrence of an interrupt or exception, the occurrence of a debug interruption, or other diagnostic event such as a breakpoint or watchpoint, or the detection of a memory access to a tracked address tracked by an exclusive monitor. In general, the processing circuitry may trap to the hypervisor in response to the WFE instruction if none of these events has occurred. If one of these events has occurred, then the WFE instruction may not trap to the hypervisor and the virtual processor may continue with processing of subsequent instructions.

This can be particularly useful where the class of event includes detection of a memory access to a tracked address tracked by an exclusive monitor. This can be useful for enabling workloads involving locks or queue structures to manage access to shared resources as discussed above. With this approach a given address to be tracked can be assigned to the exclusive monitor, which may then monitor memory accesses made by other processor cores or other threads. If a memory access to a tracked address is detected, then this can be signalled as an event. If a WFE instruction is encountered and an indication is detected that one of the events has occurred (including the memory access to the tracked address), then the WFE instruction is not trapped to the hypervisor as there is a chance that the tracked address has now been updated to the value which will lead to the trap condition not being satisfied so that the virtual processor can continue to make forward progress. If the event that occurred was not an update of the memory location corresponding to the tracked address to the required value for avoiding trapping then a subsequent attempt to execute the WFE instruction may then trap once more. With this approach the WFE instruction can effectively be used to conditionally yield control of a processor to the hypervisor, in cases where the waited-for-event has not yet happened. With the approach discussed above, such a WFE instruction can be extended to also return at least one item of scheduling hint information for enabling the hypervisor to estimate whether the trap condition is still satisfied.

For example, the at least one item of scheduling hint information may include a hint address which corresponds to the tracked address being tracked by the exclusive monitor at the time of executing the WFE instruction. This hint address may be recorded in addition to the register specifier of one or more registers specified by the conditional yield hypervisor instruction as discussed above. By recording the hint address, this enables the hypervisor to check the data value associated with the hint address itself, and determine whether the value at that hint address has changed, so that it can factor this into its scheduling decision. In cases where the data value at the hint address has not changed from its previously seen value, then it may be determined by the hypervisor that it is not worth rescheduling the same virtual processor again.

Some systems may use two-stage address translation where address translation circuitry is provided to translate a virtual address specified by an instruction executed by the processing circuitry to a physical address identifying the memory location corresponding to the virtual address, based on first address translation data indicating mapping between virtual addresses and intermediate addresses and second address translation data indicating mapping between intermediate addresses and physical addresses. Such a two stage address translation can be useful in a virtualised system because the first address translation data may be set by the virtual machine software and the second address translation data may be set by the hypervisor to allow each virtual machine to manage access to memory in the same way as if it was the only operating system running on the processing hardware, while the second address translation data can be used by the hypervisor to map conflicting intermediate addresses from different virtual machines to different physical addresses.

In such a two-stage address translation scheme, the tracked address discussed above may be a physical address. However, in response to the WFE instruction the scheduling hint information may comprise a hint address which is returned as an intermediate address, corresponding to the tracked address. This can be useful because the hypervisor may typically be able to convert the intermediate address into the hypervisor virtual address of an existing mapping more efficiently than for a physical address.

In cases where the scheduling information is to include the intermediate address corresponding to the tracked address, the scheduling hint information could also include a valid indication which is set depending on whether the intermediate address corresponding to the tracked address is available at the time of switching to the hypervisor execution mode in response to the WFE instruction. In some cases, at the time of executing the WFE instruction the intermediate address corresponds to the tracked address may not be cached within a translation look aside buffer or other address translation cache, and so obtaining the intermediate address could take some time while page table structures providing the mapping between the virtual address and intermediate address are walked to identify the intermediate address. In cases where the intermediate address is not available but the trap conditions are otherwise satisfied to enable trapping to the hypervisor execution mode, it can be more efficient to trap to the hypervisor execution mode anyway even if the full scheduling hint information including the intermediate address cannot be made available to the hypervisor. This is because trapping to the hypervisor execution mode will then offer the opportunity for the hypervisor to reschedule a different virtual processor, which would not be possible if the trap to the hypervisor execution mode was deferred until the intermediate address became available. Even if the lack of the knowledge on the intermediate address results in the hypervisor then immediately rescheduling the same virtual processor which previously trapped, this would simply be the same delay penalty as if the trapping was deferred anyway while waiting for the intermediate address. Hence, by trapping even if the intermediate address is not yet available this can improve performance by giving a chance for another virtual processor to be executed which may be more likely to make forward progress than the previously yielding virtual processor, but when the intermediate address is available then making this available in the scheduling hint information can allow a more informed decision by the hypervisor on which virtual processor to schedule next.

In some architectures the setting of the exclusive monitor may be made in response to a load exclusive instruction which specifies a target address, in response to which the instruction decoder controls the processing circuitry to trigger a load of the data value stored at the target address into a certain destination register and also to trigger the exclusive monitor to set the target address as the tracked address.

In a system using two-stage address translation as discussed above, the address translation circuitry may have a translation cache for caching parts of the address mapping between virtual, intermediate and/or physical addresses. Some approaches may use split translation caches, where a first address translation cache is provided to cache entries of the first address translation data which provide mapping between the virtual address and the intermediate address and a second separate translation cache is provided to cache parts of the second address translation data which provide mappings between intermediate addresses and physical addresses.

However, other implementations may use a combined translation cache which has cache entries for storing a mapping directly from a virtual address to a physical address, bypassing the intermediate address. Hence, when such a combined translation cache is updated, the information specified in the updated entry would depend on both the first address translation data which controls mapping between virtual addresses and intermediate addresses and the second address translation data which controls mapping between intermediate addresses and physical addresses.

In systems which use the split translation cache approach, it is more likely that when the WFE instruction is encountered following previous execution of a load exclusive instruction which led to a given target address being tracked by the exclusive monitor, the intermediate address corresponding to the tracked address may still be cached within the first address translation cache of the split translation caches.

However, in systems which use a combined translation cache, as the cache entries of the combined translation cache store a mapping directly from virtual addresses to physical addresses, it may be less likely that the intermediate address would be available for inclusion in the scheduling hint information. Hence, in such a system, it can be useful for the load exclusive instruction to trigger a lookup of the first address translation data to obtain the intermediate address corresponding to the target address of the load exclusive instruction, even when the combined translation cache already includes a cache entry storing the virtual-to-physical address mapping corresponding to the target address of the load exclusive instruction. For example the address translation circuitry may have a small amount of additional cache storage for caching a number of intermediate addresses corresponding to the target addresses of load exclusive instructions in this manner. Although such an intermediate address would not be required for servicing the load exclusive instruction itself when the required virtual to physical address mapping is already available in the address translation cache, triggering an additional intermediate address lookup can be useful because this means that if a subsequent WFE instruction is then executed it is more likely that the intermediate address corresponding to the tracked address will be available to address translation circuitry, and hence it is more likely that the intermediate address can be returned as scheduling hint information as discussed above. Hence, in micro-architectural implementations which use a combined translation cache, triggering an intermediate address lookup regardless of whether the direct virtual-to-physical address mapping for the load exclusive instruction is already available can improve performance for the hypervisor because it is more likely it will receive the intermediate address as part of the scheduling hint information so that it can make better decisions on scheduling a virtual processor.

Nevertheless, it will be appreciated that the conditional yield to hypervisor instruction, and the specific example of the WFE instruction, can also be used in micro-architectures which use split address translation caches dedicated to the first stage and second stage address mappings respectively.

In some examples the at least one item of scheduling hint information may comprise a valid indication which is set depending on whether the exclusive monitor was tracking any address as the tracked address at the time of executing the wait-for-event instruction. This indication could be the same as the valid indication which indicates whether the intermediate address was available as discussed above, or could be a separate indication. By returning an invalid indication if no address was being tracked by an exclusive monitor, this can flag to the hypervisor that it should not consider the hint address when determining whether to reschedule the virtual processor. For example, sometimes WFE instructions may be used for purposes other than handling polling of an address in memory, and so it may not always be desired to make the address tracked by the exclusive monitor available to the hypervisor, and so the valid indication can be useful for qualifying whether the storage bits corresponding to the address tracked by the exclusive monitor are to be checked by the hypervisor when making its scheduling decision.

In some cases, whether the at least one trap condition is satisfied for the conditional yield to hypervisor instruction may depend on a trap control indicator stored in a hypervisor control register, which indicates whether the conditional yield to hypervisor instruction should track to the hypervisor. Hence, in some cases there may be multiple forms of trap condition which must each be satisfied, e.g. the overall set of trap conditions may be satisfied if both the trap control indicator indicates that conditional yield to hypervisor instruction should trap and the processing circuitry determines in response to the WFE instruction that none of the class of one or more events has been indicated as having occurred.

The ability to disable trapping to the hypervisor in response to the conditional yield to hypervisor instruction using the hypervisor control register can be useful because sometimes a virtual processor may be the only virtual processor running on a given physical platform, and in that case it may be more efficient for the conditional yield to hypervisor instruction to not trap, and instead continue processing within the virtual processor itself without a trap as there may not be any other virtual processor which could make use of the processing resource provided in the hardware even if the event which the virtual processor is waiting for has not happened yet.

More particularly, the hypervisor control register may store a trap control indicator having one of a first value and a second value. With the WFE instruction example described above, when the trap control indicator has the first value, the processing circuitry may determine that the at least one trap condition is unsatisfied regardless of whether any of the class of events is indicated as having occurred. When the trap control indicator has the second value then the processing circuitry may determine whether the at least one trap condition is satisfied based on whether any of the one or more events of the required class has occurred. Hence, when the trap control indicator has the second value, if none of the class of events have indicated as having occurred then the at least one trap condition is considered satisfied, while if one of the class of one or more events is indicated as having occurred then the at least one trap condition is not satisfied.

FIG. 1 schematically illustrates an example of a data processing system 2 which includes a number of processor cores 4. In this example the system is a multi-processor system having two processor cores, but other examples could have a greater number of processor cores or could only provide a single processor core. Where multiple processor cores 4 are provided, they may communicate with each other via an interconnect 6 which may manage coherency between caches 8 within the respective cores. The processor cores 4 may share access to a shared memory system which may include a shared cache 10 and main memory 12. Each processor core 4 may include an instruction decoder 14 for decoding instructions fetched from an instruction cache or memory and generating control signals for controlling processing circuitry 16 to perform data processing operations. Each core 4 may have registers 18 for storing operands processed by the processing circuitry 16 and for storing control values for controlling the operation of the processing circuitry 16. Each core may also have a memory management unit (MMU) 20 which acts as address translation circuitry for translating between virtual and physical memory addresses, and an exclusive monitor 22 for tracking access to particular addresses by other parts of the system, both of which will be described in more detail below.

While in FIG. 1 the general configuration of each of the processor cores 4 is shown as the same, it will be appreciated that there may still be micro-architectural differences between different cores within the same system, so it is not essential for each core to be identical. For example, one processor core 4 could have processing circuitry 16 which is capable of greater throughput of instructions than the processing circuitry 16 in another core 4, or one core could have larger cache capacity than another core.

Figure 2:
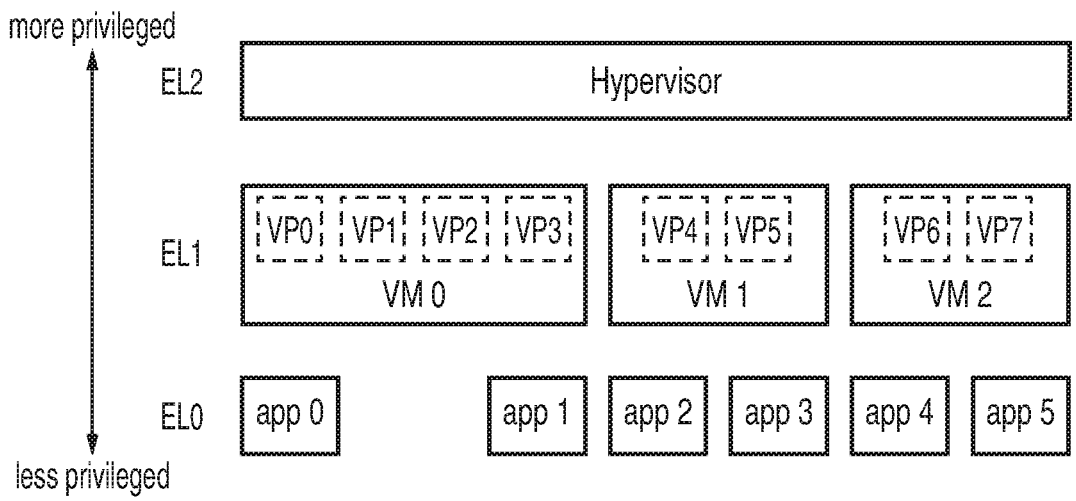
FIG. 2 shows an example of different execution modes of different privilege, including a hypervisor mode.

As shown in FIG. 2, the processing system may have an architecture which supports virtualisation, where a number of virtual machines may execute on the same physical platform under control of a hypervisor. Each virtual machine may manage the execution of a number of applications running under it in the same way as if the virtual machine was a native operating system which was the only operating system present, but the hypervisor may manage scheduling of different virtual machines, and may manage the mapping between the virtual resources (memory, peripherals, etc.) expected by the virtual machine onto the physical resources actually provided by the physical platform 2. The virtual machine may request that the hypervisor creates resources for establishing a given number of virtual processors (VPs), which each emulate the presence of a given physical processor core, but where the virtual processors VP are each mapped onto the physical cores of the physical platform provided in hardware, so that a greater number of virtual processors could be provided than are actually provided in hardware. Each virtual machine (together with the applications running under the virtual machine) may request a certain number of the virtual processors (e.g. VM0 may request creation of virtual processors VP0-VP3, VM1 may request creation of virtual processors VP4-VP5, and so on), so that from the point of view of a given virtual machine it is executing on a multi-processor-core platform with a certain number of processor cores, although these may actually be mapped onto a different number of physical cores in hardware.

To support such virtualisation, the processor cores 4 may operate according to a processor architecture which supports a number of execution modes of different privilege levels, labelled EL2, EL1, EL0 in the example of FIG. 2. In this example EL0 is the least privileged operating state and EL2 is the most privileged operating state. In some examples there could be further execution modes of even greater privilege than EL2, for example a secure monitor execution mode for executing secure monitor software for controlling partitioning between a secure operating world and less secure operating world.

In each execution mode, the processing circuitry 16 may have access to a certain subset of architectural state as stored in the registers 18. In general any state accessible to a lower privilege mode may also be accessible to other modes which are more privileged than that mode. Hence, in EL1 the instructions executed by the processing circuitry 16 may have access to any register state accessible to EL0 but may in addition also have access to some additional registers which are not accessible to the processor when operating in EL0. Similarly, when operating in EL2 a processor core may have access to certain registers which are not accessible to the processor when operating in one of EL0 and EL1. Transitions between the different execution modes may be based on exceptions and exception returns, with an exception triggering a transition from a less privileged state to a more privileged state, and processing returning to a less privileged execution mode when returning from handling of that exception. Exceptions can be caused by external events or by events caused by the software running in a given execution state, such as a memory fault or execution of the conditional yield to hypervisor instruction.

Figure 3:
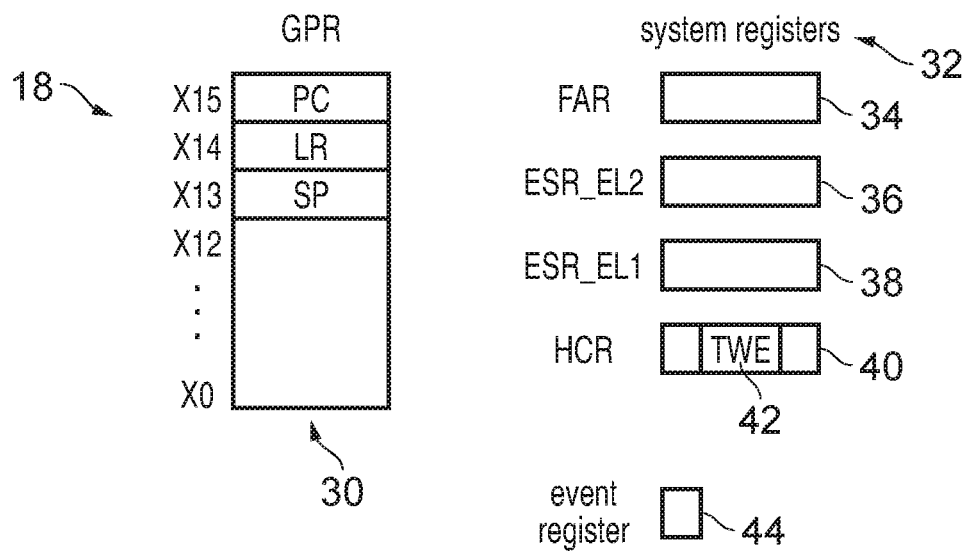
FIG. 3 shows an example of some of the architectural registers of a processor core.

FIG. 3 shows an example of a subset of the registers 18 provided in a processor core 4 according to a particular architecture. It will be appreciated that this is just some of the register state that could be provided and the registers 18 could also include other architectural registers not shown in FIG. 3, e.g. floating point registers for storing floating point values or further system registers for storing other control values.

As shown in FIG. 3, the registers 18 could include a set of general purpose registers 30 which are generally accessible to instructions executed in any of the execution modes. These may include a certain number of general purpose registers X0-X12 which may be available for instructions to use for identifying the operands for those instructions or to use as destination registers to which the result of the instruction can be written. Some of the general purpose registers may serve special purposes for controlling the operation of the processor. For example register X13 could act as a stack pointer register which provides an address of a corresponding stack data structure in memory which could be used for stacking or unstacking register state in response to exceptions and exception returns for example. Register X14 could act as a link register which stores a return address to which processing may return following processing another function. Register X15 may act as a program counter which indicates an address representing the current point of execution.

The registers 18 may also include a number of system registers 32 which may store control values used for controlling the operation of a processing circuitry 16. FIG. 3 shows a subset of these registers which may include a fault address register 34 for recording information on addresses which trigger a memory fault, a pair of banked exception status registers 36, 38 for recording information on exceptions which may have occurred, and a hypervisor control register 40 for storing control information for controlling the action of the hypervisor and for controlling which events trigger a trap to the hypervisor.

For example, memory faults may occur when the currently executed processes is not allowed to access a given region of memory to which access has been requested, or if the corresponding virtual to physical address mapping for the registered address is still undefined. In response to a memory access which triggers a memory fault, the address which caused the fault is written to the FAR 34 so that when the fault triggers a trap to the virtual machine at EL1 or the hypervisor at EL2 then the supervising code can identify from the FAR 32 the reason for the fault and can then take action, such as allocating a new entry to a page table structure to enable the address to be mapped so that the fault will not occur again.

The exception status registers 36, 38 are banked so that register 36 (ESR_EL2) is used if an exception occurs while executing in EL1, to make information on the cause of the exception available to the hypervisor executing at EL2 which can then take appropriate action. For example an exception status identifier identifying the reason for the exception could be stored in the exception status register 36. Similarly, if an exception occurs while executing at EL0 then information on the exception may be recorded to the exception status register 38 which corresponds to EL1. By banking the exception status registers this means that if a series of nested exceptions occurs (where an exception triggering a switch from EL0 to EL1 is then followed by another exception from EL1 to EL2), then once the hypervisor has handled the exception at EL2, then on returning to the virtual machine executing at EL1 the virtual machine will still be able to determine the reason for the exception previously occurring at EL0, based on the contents of the second exception status register 38 (ESR_EL1).

The hypervisor control register 40 may include a number of bits which specify whether a number of different types of events may trigger the processing circuitry to switch to the hypervisor mode EL2. One of these events may be a trap control indicator 42 which controls whether wait-for-event (WFE) instructions executed in one of EL0 and EL1 would trigger a switch to the hypervisor execution mode EL2. It will be appreciated that the hypervisor configuration register (HCR) 40 could also include a number of other pieces of control information which affects the operation of the hypervisor or defines the situations which require a trap to the hypervisor.

As shown in FIG. 3, the registers 18 may also include an event register 44 which is set if one of a number of certain class of events occurred. The event register 44 may not be directly visible to software. Events which may lead to the event register being set may include certain interrupts or exceptions, certain debug events such as breakpoints or watchpoints, or the detection of a memory access to attract address by the exclusive monitor 22 as discussed below.

Figure 4:
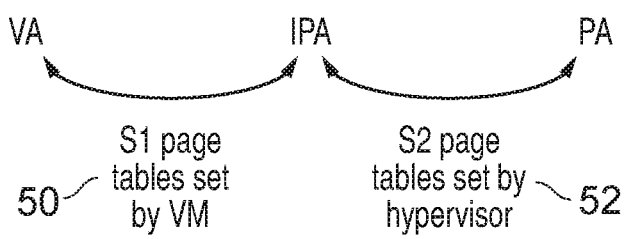
FIG. 4 shows an example of 2-stage address translation.

As shown in FIG. 4, the MMU 20 within a given processor core 4 may manage address translations according to a two-stage address translation process. The virtual machine may define stage 1 page tables 50 which are stored within the memory system to define mappings from a virtual address (VA) to an intermediate physical address (IPA). The virtual machine may have been designed assuming that it is the only operating system running and assuming that the intermediate physical addresses are actually the physical addresses directly identifying the corresponding locations in the memory system. However, the hypervisor may set stage 2 page tables 52 which control mapping the intermediate physical addresses to physical addresses which actually identify the corresponding location in the memory system. This can allow the hypervisor to map IPAs used by different virtual machines to refer to different variables in memory to different physical addresses to avoid conflict.

As shown in FIG. 1, the MMU may include at least one address translation cache 21 (also known as a translation lookaside buffer or TLB) for caching portions of the page tables 50, 52 for faster access than if they had to be read from memory each time. In some systems the TLB 21 may be a split TLB where separate stage 1 and stage 2 TLBs are provided for caching portions of the stage 1 and stage 2 page tables 50, 52 respectively. However other systems may use a unified TLB 21 where each cache entry of the TLB stores a mapping direct from VA to TA which is derived from the combination of entries read from the stage 1 and stage 2 page tables 50, 52, so that the physical address can be located faster if it is already cached in the unified TLB for a given virtual address.

As shown in FIG. 1, a given processor core 4 has an exclusive monitor 22 which may be used to monitor accesses to a certain address in memory. Although FIG. 1 shows the exclusive monitor 22 being provided within the processor core 4 itself, in other examples the exclusive monitor can be provided within the interconnect 6. Hence in general the core 4 has access to the exclusive monitor 22 which provides a structure to which an address to be monitored can be registered. Once an address has been registered as being tracked in the exclusive monitor 22, the exclusive monitor hardware 22 may check the addresses of memory accesses made by other parts of the data processing system to detect whether the tracked address has been accessed. For example the exclusive monitor 22 may intercept snoops received from the interconnect 6 which are triggered by accesses to memory by another processor core 4, and if the address indicated in the snoop request matches the tracked address recorded in the exclusive monitor 22, then the exclusive monitor may signal an event and this may trigger a setting of the event register 44 shown in FIG. 3.

As shown in FIG. 5, the setting of an address to be tracked by the exclusive monitor 22 may be performed in response to a load exclusive instruction decoded by the instruction decoder 14. At step 100 the load exclusive instruction is encountered. The load exclusive instruction may specify a destination register and one or more parameters for identifying a memory address #add which may be a virtual address. For example the address could be identified through a base register and offset or base register and immediate value, or any other addressing mode. In response to the load exclusive instruction, at step 102 the processing circuitry 16 triggers the exclusive monitor 22 to set the physical address which corresponds to the virtual address #add as the tracked address to be monitored. If any other address was previously being tracked then this may be discarded, as in some examples there may only be space for tracking one address at a time. At step 104 in response to the load exclusive instruction the processing circuitry 16 is also controlled to trigger a load of a data value from the address in memory corresponding to the specified address #add to the destination register Xd.

FIG. 6 shows a flow diagram illustrating tracking of memory accesses by the exclusive monitor 22. At step 110 the exclusive monitor 22 detects that a memory access to a given address is requested, for example by intercepting a snoop request triggered by that memory access request. At step 112 the exclusive monitor compares the address specified by the memory access with the tracked address registered for being monitored, and determines whether they are the same. If not then tracking continues and the method returns to step 110 to detect the next memory access. If the address of the memory access does match the tracked address then at step 114 an event is signalled by updating the event register 44.

The use of the load exclusive instruction to set the exclusive monitor can be useful for enabling polling behaviours where a given virtual machine (or application running under the virtual machine) can poll a variable in shared memory using the load exclusive instruction followed by a wait-for-event (WFE) instruction which may indicate the processing circuitry 16 that no other action is needed until an event is signalled. For example, such a virtual machine may include a polling loop as follows:

| | |
|---|---|
| MOV X2, #0xFF00 | // we are going to poll bit 15:8 |
| SEVL | // send a local event to avoid trapping immediately |
| loop: | |
| WFE | // if no event is pending, trap to the hypervisor |
| LDXR X0, [X1] | // X1 holds the guest virtual address of the variable in //shared memory |
| AND X0, X0, X2 | // isolate required part of variable using mask |
| CBNZ X0, loop | // compare variable with 0 and loop until |
| variable is non-zero | |

Hence, the first time the loop is executed the WFE instruction detects that an event has occurred because it has immediately followed the SEVL instruction which was used to trigger a local event to ensure that the subsequent load exclusive instruction will be executed at least once. The load exclusive instruction then reads the shared variable from memory and the AND instruction masks the return value based on the mask in register X2 and the conditional branch instruction CBNZ will branch back to the marker "loop" if the mask value is non-zero. Hence this is an example where the loop will continue to loop round until the value of the variable in shared memory changes to zero, for example this may indicate that no other process now holds a lock which governs access to some associated data structure in memory. At this point the virtual processor executing the virtual machine or the application will then be able to proceed beyond the loop to the code which actually uses that data structure.

In systems where the virtual processor executing the virtual machine or application is the only virtual processor running then the WFE instruction may simply lead to the processing circuitry 16 pausing execution until an event is signalled, at which point it is checked whether the value in shared memory has changed. However in a virtualised system simply allowing the virtual processor to pause can be inefficient since in the time waiting for an event to be signalled the hypervisor could reschedule another virtual processor which could do some useful work with the processor time in the period when the previous virtual processor is waiting for the event to happen. Hence, it may be desirable to configure WFE instructions so that they trap to the hypervisor in cases where no event is pending. This can be done by setting the TWE flag 42 in the hypervisor configuration register 40 to indicate that WFE instruction should trigger a trap to the hypervisor in cases where none of the relevant class of events has occurred.

However, even if the WFE instruction triggers a trap to the hypervisor, the hypervisor then needs to decide which virtual processor to schedule next. If, say, virtual processor VP0 has just trapped due to a WFE instruction within a polling loop as in the example above, if the hypervisor simply selects VP0 again and the polled variable in memory has not changed then this will simply lead to the virtual processor trapping again and so no forward progress is made and the processor time is wasted. It may be better for the hypervisor to select one of the other virtual processors VP1-VPn which may be able to make forward progress. However, the hypervisor may have little visibility of the precise operations being performed within each virtual machine and so may not know whether the trap to the hypervisor was caused by a WFE instruction within a loop which is polling a shared variable in memory. In some workloads, which use a queue mechanism to handle access to shared data in a certain order between a number of different virtual processors, this problem may even be more significant because, say if the virtual processors are in the queue in the order VP1, VP2, VP0, then in order for any of the VPs to make forward progress using the shared variable, the hypervisor should select VP1 next as neither VP0 nor VP2 would be able to make progress if they are behind VP1 in the queue. However, with existing techniques it is difficult for the hypervisor to gain access to information which would enable them to decide which virtual processor is least likely to be held up due to access to a shared lock structure or queue. One approach may be para-virtualisation, but downsides to such an approach are lack of portability and loss of performance as discussed above.

As shown in FIG. 7, in this application an alternative approach is proposed where the WFE instruction is extended to take as source operands a pair of register arguments, Xa, Xb, but otherwise the trapping behaviour is as discussed above for the WFE instruction. Hence, in cases where the TWE bit 42 of the hypervisor control register 40 is set to the appropriate value, the WFE instruction will trigger a trap to the hypervisor when none of the relevant events has been signalled in the event register 44. However, when the WFE instruction does trap to EL2, this triggers return of scheduling hint information to the hypervisor, which is made accessible to the hypervisor within some of the system registers 32 that are accessible to the hypervisor. For example the register numbers of the register numbers Xa, Xb specified by the WFE instruction, and an indication of their register width, may be written to the exception status register 36 associated with the hypervisor execution mode EL2. Also, the fault address register 34 may be updated to indicate the intermediate physical address which corresponds to the physical address being tracked by the exclusive monitor 22 if the exclusive monitor 22 was currently tracking a tracked address and the intermediate physical address is available to the MMU 20 in its TLB 21, or if the exclusive monitor 22 was not currently tracking any address or the intermediate physical address corresponding to the tracked physical address is not available, then the fault address register 34 could be set with an invalid indication to indicate that it does not represent a real intermediate physical address. For example, this invalid indication could be an address value which does not correspond to a real address in memory. For example a portion of the address space may be reserved for special values which do not correspond to actual memory locations, and the invalid indication could be one of those special values.

With this new instruction, a virtual machine or application can poll a variable in shared memory using a load-exclusive instruction, followed by the new WFE instruction if the variable has not yet reached the desired value. If the variable has not been updated concurrently and therefore an event has not been generated, the new instruction traps to the hypervisor if the trap controls in the hypervisor control register 40 are set appropriately. The virtual machine or application can use the two register arguments Xa, Xb in the WFE instruction to pass the last value of the shared variable that was observed and any mask specifying the bits which were being polled to the hypervisor.

For example, a modified version of the code sequence shown above is shown using the new instruction here:

```
MOV X2, #0xFF00      // we are going to poll bit 15:8
SEVL                 // send a local event to avoid trapping immediately
loop:
WFE X0, X2           // if no event is pending, trap to the hypervisor, providing
                     // the last seen value and the mask
LDXR X0, [X1]        // X1 holds the guest virtual address of the variable in
                     //shared memory
AND X0, X0, X2       // isolate required part of variable using mask
CBNZ X0, loop        // compare variable with 0 and loop until
variable is non-zero
```

Hence, if the WFE instruction traps then the hypervisor can retrieve the intermediate physical address for the virtual address in X1 by reading the fault address register 34 and then obtain its own virtual mapping for the same underlying physical page (e.g. based on known offsets between existing mappings). With this mapping in place, determining whether or not to reschedule the same virtual processor again could use code like the following example:

```
LDR X0, [X1]         // X1 holds the hypervisor virtual address of the variable in
                     // shared memory
EOR X0, X0, X2       // X2 was passed as the first WFE argument from the
guest (VM) AND X0, X0, X3 // X3 was passed as the second WFE
argument from the guest
```

Here, if X0 resulting from the AND instruction is 0 then the virtual processor should not be rescheduled since it is likely to trap on the next iteration of the polling loop as the bits being polled have not changed. This approach does not suffer from the problems described with para-virtualisation as discussed above and would work correctly without modification in a native environment where WFE instructions were not trapped.

It will be appreciated that the particular software sequences shown above are just one example use case for the WFE instruction described above. The same WFE instruction provided at the architectural level could be used in other ways by software programmers, e.g. to pass other scheduling hint information as identified in the registers Xa, Xb to the hypervisor, so it is not necessary for these registers to indicate the last seen value of the polled variable and the mask as in the example above. Whether those registers provide the last seen value and the mask will depend on what instructions have been executed prior to the WFE instruction, rather than being a required function of the instruction set architecture supported by the instruction decoder 40.

In some examples, the scheduling hint information provided by the WFE instruction may be used when making scheduling decisions to select between the virtual processors which are owned by the same virtual machine, but scheduling decisions for switching between a virtual processor owned by one virtual machine and a virtual processor owned by a different virtual machine may be independent of the scheduling hint information provided by the WFE instruction. This is because it may be relatively unlikely that virtual processors of different virtual machines would be sharing access to a shared memory structure. It will be appreciated that in any case software developers may find other uses for the scheduling hint information returned by the WFE instruction—the architectural functionality of the WFE instruction discussed below does not prescribe what subsequent use is made of this scheduling hint information.

The architectural functionality of the WFE instruction is now discussed below with respect to FIG. 8. The WFE instruction is an example of a conditional yield to hypervisor instruction, which may trigger a switch to the hypervisor execution mode if certain trap conditions are satisfied. At step 200, the instruction decoder 40 decodes a conditional yield to hypervisor instruction and the decoded instruction is passed to the processing circuitry 16 to be executed. It will be appreciated that instruction execution is pipelined so that the decoding of the instruction may take place a number of cycles earlier than the instruction being executed. In response to encountering a decoded conditional yield to hypervisor instruction, at step 202 the processing circuitry 16 determines whether the current mode of execution is the hypervisor mode or any higher privilege mode than the hypervisor mode, and if so then at step 204 the processing circuitry 16 can remain in the current mode of execution. For example WFE instructions executed in the hypervisor execution mode EL2 may simply lead to the processor waiting until an event is signalled, rather than any switch of execution mode.

If the current mode in which the conditional yield to hypervisor instruction was executed is a less privileged execution mode than the hypervisor execution mode EL2 (e.g. the instruction is executed at EL0 or EL1) then at step 206 the processing circuitry determines whether any trap conditions required for trapping to the hypervisor mode are satisfied. These will be discussed in more detail with respect to FIG. 9 below. If any trap condition is not satisfied then again at step 204 the processing circuitry remains in the current mode of execution.

If at step 206 the required trap condition(s) are satisfied then at step 208 the processing circuitry switches to the hypervisor execution mode EL2 so that the hypervisor can step in and determine whether it may be useful to reschedule a different virtual processor so that forward progress of that virtual processor can be made in the time when waiting for the trap conditions required by the previous virtual processor to no longer be satisfied. At step 210, on switching to the hypervisor mode, scheduling hint information is stored to at least one storage element accessible to instructions in the hypervisor mode. The storage of the scheduling hint information is shown in more detail in FIG. 10 below. By making scheduling hint information accessible to the hypervisor at an architectural level, so that the hardware automatically stores the hint information to certain registers or other storage elements accessible to the hypervisor, without needing explicit memory access instructions to marshal some messages using shared data structures in memory to communicate between the virtual machine and hypervisor, this improves performance and portability for the reasons discussed above.

Figure 9:
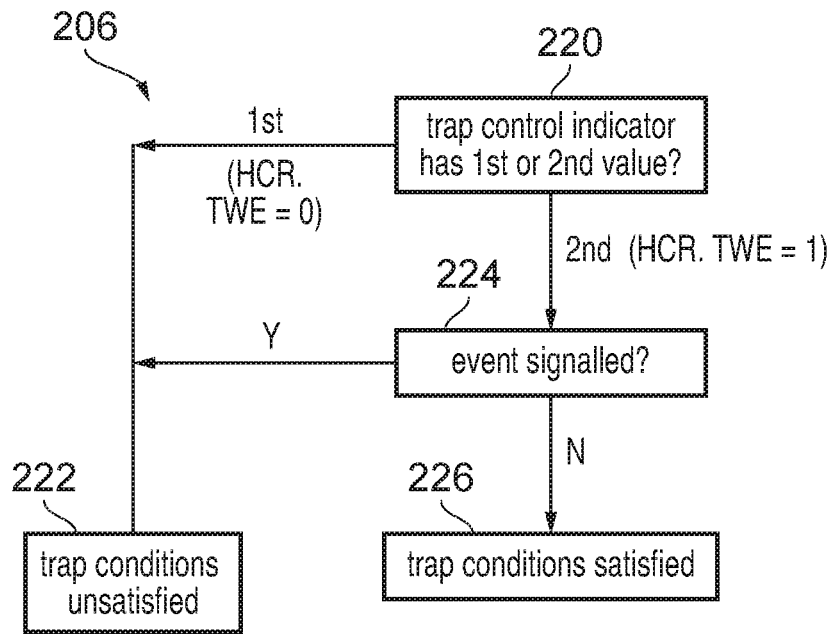
FIG. 9 is a flow diagram showing in more detail steps for determining whether trap conditions are satisfied for the conditional yield to hypervisor instruction.

FIG. 9 shows step 206 for determining whether the trap conditions are satisfied in more detail. At step 220 the processing circuitry determines whether the trap control indicator 42 (which governs whether the conditional yield to hypervisor instruction (WFE) traps) is set to a first value or a second value. In this example the trap control indicator 42 has a first value when the corresponding bit of the hypervisor configuration register 40 is set to 0 and has a second value when that bit is set to 1, but another example could be the other way round. If the trap control indicator has the first value then at step 222 the trap conditions are determined to be unsatisfied regardless of whether any event has been signalled in the event register 44. Hence, when the trap control indicator is set to the first value then the WFE instruction will not trap to the hypervisor. This can be useful for allowing a hypervisor to disable tracking if it is only currently managing one virtual processor for example.

If the trap control indicator has the second value then at step 224 the processing circuitry determines whether the event register 44 has been set to indicate that an event has been signalled. The event could be any of a class of events mentioned above, in particular if the exclusive monitor 22 has detected an access to the tracked address then an event may have been signalled. If an event has been signalled then again the method proceeds to step 222 where the trap conditions are determined not to be satisfied. On the other hand, if an event has not been signalled then the method proceeds from step 224 to step 226 where the required trap conditions are determined to be satisfied, and so in this case the WFE instruction or other type of conditional yield to hypervisor instruction will trigger a switch to hypervisor mode at step 208 of FIG. 8.

Figure 8:
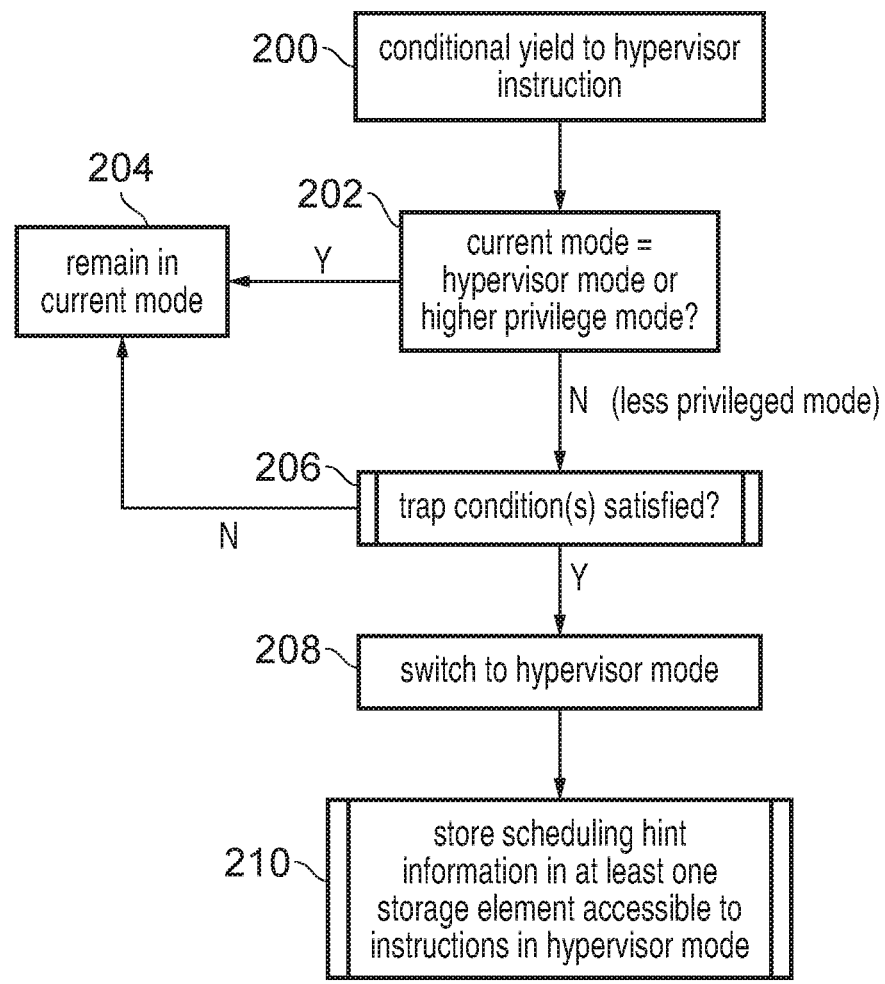
FIG. 8 is a flow diagram showing a method of processing the conditional yield to hypervisor instruction.
Figure 10:
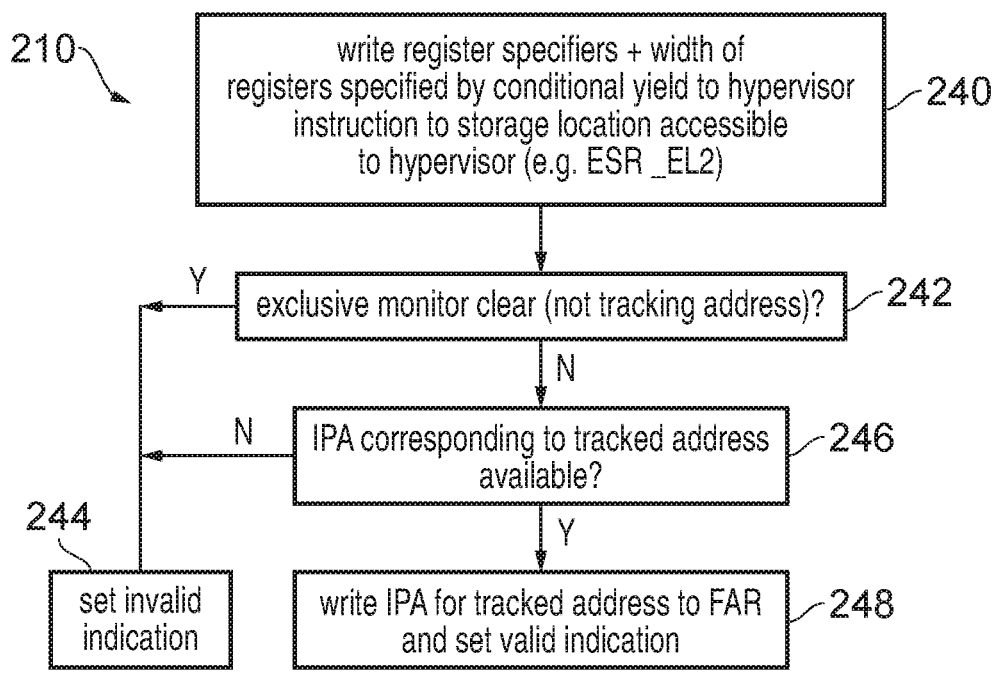
FIG. 10 is a flow diagram showing in more detail steps for storing scheduling hint information in response to the conditional yield to hypervisor instruction.

FIG. 10 shows step 210 of FIG. 8 in more detail. At step 240 the processing circuitry writes the register specifiers and register width of the pair of registers Xa, Xb specified by the conditional yield to hypervisor instruction to one of the system registers that is accessible to the hypervisor. In particular, it can be useful for this to be written to the exception status register 36 corresponding to EL2. At step 242 the processing circuitry 16 detects whether the exclusive monitor is currently clear (not tracking any addresses) and if so then at step 244 an invalid indication is set within the fault address register 34. If the exclusive monitor is currently set then at step 246 it is detected whether the intermediate physical address corresponding to the tracked physical address registered in the exclusive monitor 22 is available to the MMU 20 within its TLB 21 and if not then again at step 244 the invalid indication is set in the fault address register 34.

If the exclusive monitor is currently set and the intermediate physical address for the tracked physical address is currently available to the TLB 21, then at step 248 the intermediate physical address corresponding to the tracked physical address is written to the fault address register 34 and a valid indication is set. In some cases a valid indication could simply be that the address in the fault address register is one of a number of invalid address values which cannot correspond to a real address. Alternatively a separate valid bit could qualify the address within the fault address register. Similarly, at step 244 the invalid indication could either be a prohibited address value which cannot correspond to a real address or could be indicated by a separate invalid indication. While FIG. 10 shows an example where the same invalid indication is used for both cases where the exclusive monitor is currently clear and cases where the intermediate physical address is not currently available, in other examples two separate invalid indicators may distinguish these two situations.

In systems where the TLB 21 of the MMU 20 is implemented as a split TLB with separate stage 1 and stage 2 TLB structures, it may be relatively likely that the IPA corresponding to the tracked physical address will be available in the TLB 21 at the time that the WFE instructions executed, because if the WFE instruction is used in a loop of the type shown above here it will follow shortly after a load exclusive instruction which will cause the address mapping for that intermediate physical address to be loaded into the TLB (if it was not already in the TLB).

However, in examples where the TLB 21 is implemented as a combined TLB which combines entries from the stage 1 and stage 2 page tables 50, 52 into a single unified entry which maps addresses directly from virtual address to physical address, then if the load exclusive instruction hits in an already allocated combined TLB entry then the load exclusive instruction would not normally trigger an address lookup of the stage 1 page tables 50 in order to obtain the intermediate physical address. However, if the load exclusive instruction was handled in this way then this could make it less likely that the IPA corresponding to the tracked address would be available at step 246 when a subsequent WFE instruction is used.

Hence, in micro-architectures which use a combined TLB, it can be useful to trigger a stage 1 table walk even if not needed to service the load exclusive instruction. Hence, in the method of FIG. 5, when a load exclusive instruction is encountered, then when the target address did not already have an address mapping cached in the combined TLB 21, then a page table walk is triggered to obtain the intermediate physical address from the stage 1 page tables 50 and to subsequently obtain the physical address form the stage 2 page tables 52, as well as recording the combined virtual address to physical address mapping in the combined TLB 21. At the time the MMU 21 may also record the intermediate physical address within a certain storage region of the MMU 20, in case a subsequent WFE instruction needs it for the scheduling hint information. Also, in cases where the load exclusive instruction hits against an already allocated entry of the TLB and the intermediate physical address is not already available within the MMU 21, then even though the load exclusive instruction could be serviced based on the physical address already provided within the combined TLB, the load exclusive instruction may nevertheless trigger a stage 1 page table walk of the stage 1 page tables 50 to obtain the corresponding intermediate physical address, and then this can be recorded for use by the subsequent conditional yield to hypervisor instruction, even though it is not directly needed to handle the load exclusive instruction because the physical address was already cached. By triggering an intermediate physical address lookup in response to the load exclusive instruction, this can make it more likely that when the WFE instruction is encountered then at step 246 of FIG. 10 the intermediate physical address will be available. Hence, it is more likely that useful scheduling hint information can be provided to the hypervisor, which can help to improve efficiency of scheduling of the virtual processors when the hypervisor makes it scheduling decision.

It will be appreciated that this triggering of the extra IPA lookup is not an essential part of the architecture, as it depends on the micro-architectural implementation whether this is needed. For example, the extra IPA lookup may not be needed in systems with split TLBs dedicated to stage 1 and stage 2 address translations. Also, even in a system using a combined TLB, some micro-architecture designers may choose to reduce complexity of implementing a load exclusive instruction and save power by avoiding triggering the unnecessary IPA access (at the expense of less useful hypervisor scheduling hint information). Nevertheless by triggering such an IPA lookup this can improve performance of a hypervisor in those micro-architectures which wish to do so.

Figure 11:
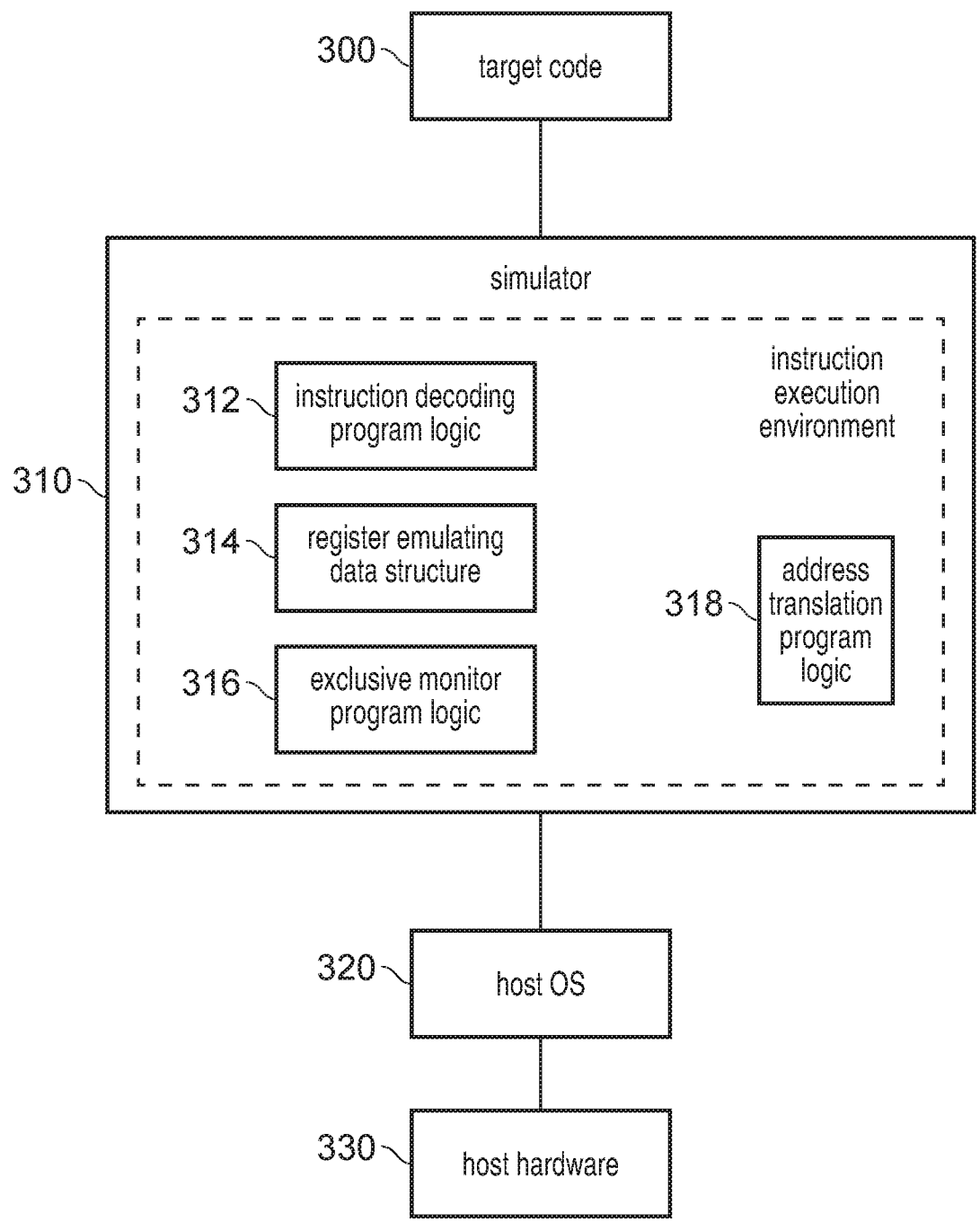
FIG. 11 shows a simulator example that may be used.

FIG. 11 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the application program interface of the hardware architecture being modelled by the simulator program 310. Thus, the program instructions of the target code 300, including the conditional yield to hypervisor instruction described above, may be executed from within the instruction execution environment using the simulator program 310, so that a host computer 330 which does not actually have the hardware features of the apparatus 2 discussed above can emulate these features. The simulator program 310 may have instruction decoding program logic 312, exclusive monitor program logic 316 and address translation program logic 318 corresponding in functionality to the instruction decoder 14, exclusive monitor 22 and MMU 20 described above, and program logic for managing a register emulating data structure 314 (stored in memory of the host hardware 330) to emulate the architectural registers 18 of the apparatus 2.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
    processing circuitry to perform data processing; and
    an instruction decoder to decode instructions to control the processing circuitry to perform the data processing;
    in which:
    the processing circuitry has a hypervisor execution mode for execution of a hypervisor for managing one or more virtual processors executing on the processing circuitry, and at least one less privileged execution mode than the hypervisor execution mode;

in response to a conditional yield to hypervisor instruction executed in said at least one less privileged execution mode, the instruction decoder is configured to control the processing circuitry to:
  determine whether at least one trap condition is satisfied, and when the at least one trap condition is determined to be satisfied:
    switch the processing circuitry to the hypervisor execution mode; and
    store, in at least one storage element accessible to instructions executed in the hypervisor execution mode, at least one item of scheduling hint information for estimating whether the at least one trap condition is still satisfied.

2. The apparatus according to claim 1, in which the scheduling hint information comprises an indication of at least one register specifier specified by the conditional yield to hypervisor instruction.

3. The apparatus according to claim 2, in which the scheduling hint information comprises an indication of a register width of at least one register specified by said at least one register specifier.

4. The apparatus according to claim 2, in which the scheduling hint information comprises an indication of a plurality of register specifiers specified by the conditional yield to hypervisor instruction.

5. The apparatus according to claim 1, in which the conditional yield to hypervisor instruction comprises a wait-for-event instruction for instructing the processing circuitry to wait until one of a class of one or more events is indicated as having occurred; and
  the processing circuitry is configured to determine that said at least one trap condition is unsatisfied when one of said class of one or more events is indicated as having occurred.

6. The apparatus according to claim 5, said class of one or more events including detection of a memory access to a tracked address tracked by an exclusive monitor.

7. The apparatus according to claim 6, in which said at least one item of scheduling hint information comprises a hint address corresponding to the tracked address being tracked by the exclusive monitor at the time of executing the wait-for-event instruction.

8. The apparatus according to claim 7, comprising address translation circuitry to translate a virtual address specified by an instruction executed by the processing circuitry to a physical address identifying a memory location corresponding to the virtual address, based on first address translation data indicative of a mapping between the virtual address and an intermediate address, and second address translation data indicative of mapping between the intermediate address and the physical address;
  where the tracked address is a physical address and the hint address is the intermediate address corresponding to the tracked address.

9. The apparatus according to claim 8, in which the scheduling hint information includes a valid indication set dependent on whether the intermediate address corresponding to the tracked address is available at the time of switching to the hypervisor execution mode.

10. The apparatus according to claim 5, comprising a hypervisor control register to store a trap control indicator having one of a first value and a second value;
  when the trap control indicator has the first value, the processing circuitry is configured to determine that the at least one trap condition is unsatisfied regardless of whether one of said class of one or more events is indicated as having occurred; and
  when the trap control indicator has the second value, the processing circuitry is configured to determine that the at least one trap condition is satisfied when none of said class of one or more events is indicated as having occurred.

11. The apparatus according to claim 6, in which in response to a load exclusive instruction specifying a target address, the instruction decoder is configured to control the processing circuitry to trigger the exclusive monitor to set the target address as the tracked address.

12. The apparatus according to claim 11, comprising address translation circuitry to translate a virtual address specified by an instruction executed by the processing circuitry to a physical address identifying a memory location corresponding to the virtual address, based on first address translation data indicative of a mapping between the virtual address and an intermediate address, and second address translation data indicative of mapping between the intermediate address and the physical address;
  the address translation circuitry comprises a combined translation cache comprising a plurality of cache entries each for storing a virtual-to-physical address mapping; and
  in response to the load exclusive instruction, the address translation circuitry is configured to trigger a look up of the first address translation data to obtain the intermediate address corresponding to the target address, even when the combined translation cache already includes a cache entry storing the virtual-to-physical address mapping corresponding to the target address of the load exclusive instruction.

13. The apparatus according to claim 6, in which said at least one item of scheduling hint information comprises a valid indication set dependent on whether the exclusive monitor was tracking any address as the tracked address at the time of executing the wait-for-event instruction.

14. The apparatus according to claim 1, comprising a hypervisor control register to store a trap control indicator indicating whether the conditional yield to hypervisor instruction should trap to the hypervisor; in which:
  in response to the conditional yield to hypervisor instruction, the processing circuitry is configured to determine whether the at least one trap condition is satisfied depending on the trap control indicator.

15. A data processing method for an apparatus comprising processing circuitry having a hypervisor execution mode for execution of a hypervisor for managing one or more virtual processors executing on the processing circuitry, and at least one less privileged execution mode than the hypervisor execution mode; the method comprising;
  decoding a conditional yield to hypervisor instruction executed in said at least one less privileged execution mode; and
  in response to decoding the conditional yield to hypervisor instruction:
    determining whether at least one trap condition is satisfied, and based on the at least one trap condition being determined to be satisfied:
    switching the processing circuitry to the hypervisor execution mode; and
    storing, in at least one storage element accessible to instructions executed in the hypervisor execution mode, at least one item of scheduling hint information for estimating whether the at least one trap condition is still satisfied.

16. A non-transitory machine-readable storage medium storing a computer program for controlling a host data processing apparatus to provide an instruction execution environment for execution of instructions; the computer program comprising:
  instruction decoding program logic to decode instructions of target code executed in the instruction execution environment, to control the host data processing apparatus to perform data processing corresponding to the instructions of the target code, the instruction execution environment having a hypervisor execution mode for execution of a hypervisor for managing one or more virtual processors executed in the instruction execution environment, and at least one less privileged execution mode than the hypervisor execution mode; in which:
  in response to a conditional yield to hypervisor instruction of the target code executed in said at least one less privileged execution mode, the instruction decoding program logic is configured to control the host data processing apparatus to:
    determine whether at least one trap condition is satisfied, and
    when the at least one trap condition is determined to be satisfied:
      switch the instruction execution environment to the hypervisor execution mode; and
      store, in at least one data structure accessible to instructions of the target code executed in the hypervisor execution mode, at least one item of scheduling hint information for estimating whether the at least one trap condition is still satisfied.

\* \* \* \* \*